(12) United States Patent
Mitsuya et al.

(10) Patent No.: US 8,936,239 B2
(45) Date of Patent: *Jan. 20, 2015

(54) SHEET TAKE-OUT APPARATUS AND SHEET TAKE-OUT METHOD

(71) Applicant: Kabushiki Kaisha Toshiba, Minato-ku (JP)

(72) Inventors: Yusuke Mitsuya, Kanagawa-ken (JP); Yukio Asari, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,199

(22) Filed: Oct. 25, 2013

(65) Prior Publication Data

US 2014/0041990 A1 Feb. 13, 2014

Related U.S. Application Data

(62) Division of application No. 12/349,742, filed on Jan. 7, 2009, now Pat. No. 8,641,042, and a division of application No. 11/175,216, filed on Jul. 7, 2005, now Pat. No. 7,537,212.

(30) Foreign Application Priority Data

Jul. 9, 2004 (JP) ................. 2004-203429

(51) Int. Cl.
*B65H 3/52* (2006.01)
*B65G 47/31* (2006.01)
(Continued)

(52) U.S. Cl.
CPC ............... *B65G 47/31* (2013.01); *B65H 1/025* (2013.01); *B65H 1/24* (2013.01); *B65H 3/0653* (2013.01);
(Continued)

(58) Field of Classification Search
USPC ............... 271/125, 258.02, 262, 265.04, 263
See application file for complete search history.

(56) References Cited

U.S. PATENT DOCUMENTS 3,373,685 A 3/1968 Adams
5,505,440 A 4/1996 Uematsu
(Continued)

FOREIGN PATENT DOCUMENTS

DE 2742802 4/1979
DE 286555 A5 1/1991
(Continued)

OTHER PUBLICATIONS

Machine translation of JP 2003-312895, retrieved Jun. 11, 2014.*
(Continued)

*Primary Examiner* — Michael McCullough
(74) *Attorney, Agent, or Firm* — Oblon, Spivak, McClelland, Maier & Neustadt, L.L.P.

(57) ABSTRACT

A sheet take-out apparatus includes a first separation unit, a second separation unit, a drawing roller for drawing sheets from a nip of the second separation unit, and a pinch roller rotating in contact with it. Overlapping sheets which pass the first and second separation units and are not separated are detected to be overlapped in a state that they are clamped by the nip of the drawing roller and pinch roller. When overlapping is detected, in a state that the rear ends of the overlapping sheets in the conveying direction are restricted by the nip, the drawing roller and pinch roller are stopped and the overlapping sheets are re-separated.

16 Claims, 5 Drawing Sheets

(51) Int. Cl.
  *B65H 1/02* (2006.01)
  *B65H 1/24* (2006.01)
  *B65H 3/06* (2006.01)
  *B65H 5/06* (2006.01)
  *B41J 11/00* (2006.01)
  *B65H 3/46* (2006.01)

(52) U.S. Cl.
  CPC .............. *B65H 5/062* (2013.01); *B41J 11/006* (2013.01); *B65H 3/46* (2013.01); *B65H 2301/44514* (2013.01); *B65H 2511/524* (2013.01); *B65H 2701/1313* (2013.01); *B65H 2701/1916* (2013.01)
  USPC .......................................... 271/125; 271/262

(56) References Cited

U.S. PATENT DOCUMENTS

| | | | |
|---|---|---|---|
| 5,848,784 | A | 12/1998 | Tranquilla |
| 6,076,824 | A | 6/2000 | Oppliger et al. |
| 6,554,275 | B1 | 4/2003 | Tranquilla |
| 8,454,013 | B2 * | 6/2013 | Mitsuya et al. .......... 271/258.02 |
| 8,641,042 | B2 * | 2/2014 | Mitsuya et al. .......... 271/258.02 |
| 2003/0168798 | A1 | 9/2003 | Tufekci et al. |

FOREIGN PATENT DOCUMENTS

| | | |
|---|---|---|
| DE | 19607304 | 7/1997 |
| DE | 19743020 C2 | 4/1999 |
| DE | 19801309 C1 | 8/1999 |
| DE | 19835828 C1 | 8/1999 |
| DE | 10142331 C1 | 3/2003 |
| DE | 10212024 A1 | 10/2003 |
| EP | 1 367 015 A2 | 12/2003 |
| EP | 1 367 015 A3 | 5/2005 |
| GB | 1 216 876 | 12/1970 |
| JP | 58-59137 | 4/1983 |
| JP | 62-056181 | 3/1987 |
| JP | 62-56181 | 3/1987 |
| JP | 63-110438 U | 7/1988 |
| JP | 2-209346 A | 8/1990 |
| JP | 6-41943 Y2 | 11/1994 |
| JP | 2000-165594 | 6/2000 |
| JP | 2000/165594 | 8/2000 |
| JP | 2003-081461 | 3/2003 |
| JP | 2003/312895 | 11/2003 |
| JP | 2003-312895 | 11/2003 |
| JP | 2003-341860 | 12/2003 |
| WO | WO 2004/037449 | 5/2004 |

OTHER PUBLICATIONS

European Search Report for Application No. EP 05012147 dated Nov. 8, 2005.

Notice of Opposition filed in the European Patent Office on Feb. 26, 2010 in EP 1 614 645 B1.(21 pages).

Notification of Reasons for Refusal for Japanese Patent Application No. 2004-203429 dated Nov. 4, 2009.

* cited by examiner

SHEET TAKE-OUT APPARATUS AND SHEET TAKE-OUT METHOD

CROSS REFERENCE TO RELATED APPLICATION

This application is a divisional of co-pending U.S. patent application Ser. No. 12/349,742, filed on Jan. 7, 2009, which is a divisional of U.S. patent application Ser. No. 11/175,216, filed on Jul. 7, 2005, now U.S. Pat. No. 7,537,212, which claims the benefit of priority from the prior Japanese Patent Application No. 2004-203429, filed on Jul. 9, 2004; the entire contents of which all applications are incorporated herein by reference in their entireties.

FIELD OF THE INVENTION

The present invention relates to a sheet take-out apparatus and a sheet take-out method for separating and taking out a plurality of sheets one by one onto a conveying route.

DESCRIPTION OF THE BACKGROUND

Conventionally, for example, as described in Japanese Patent Application Publication No. 2003-81461, as a sheet take-out apparatus, an apparatus including a feed-out roller rotating in contact with a sheet at one end in the stacking direction, thereby feeding out the concerned sheet, a take-out roller for rotating in contact with the fed-out sheet, thereby taking out the concerned sheet on a conveying route, a separation roller for separating sheets pressed to the take-out roller via the conveying route and given separation force in the reverse direction, thereby overlapped, and a conveying roller for conveying sheets passing a nip between the take-out roller and the separation roller is known.

In this apparatus, when a sheet conveyed by the conveying roller is detected, the take-out roller is rotated reversely, thus overlapping sheets can be easily separated by the separation roller.

However, in this apparatus, overlapping sheets which cannot be separated by the separation roller are conveyed straight to the later stage of processor via the conveying roller. The sheets conveyed in the overlapping state cause jamming in conveyance.

Therefore, it may be considered to add a re-separation unit for re-separating overlapping sheets passing through the separation roller. However the apparatus constitution is complicated and a new problem arises that the cost of apparatus is increased.

Further, overlapping sheets are generally rejected during conveyance and are removed from processing objects, so that when overlapping of sheets occurs, the rejected sheets must be re-supplied and processed. Thus a problem arises that the processing capacity of the apparatus is reduced.

SUMMARY OF THE INVENTION

An object of the present invention is to provide a sheet take-out apparatus and a sheet take-out method for surely separating overlapping sheets and enhancing the processing capacity.

According to the embodiments of the present invention, the sheet take-out apparatus comprising a take-out unit for taking out a plurality of sheets in a stacked state one by one on a conveying route, a separation unit for shifting and separating overlapping sheets taken out on the conveying route in a stacked state by the take-out unit, an overlapping detector for detecting overlapping sheets not separated by the separation unit, and a re-separation unit for clamping the rear ends of the overlapping sheets detected by the overlapping detector in the conveying direction to reduce the speed and re-separating the overlapping sheets is provided.

Furthermore, according to the embodiments of the present invention, a sheet take-out method comprising the steps of taking out a plurality of sheets in a stacked state one by one on a conveying route, shifting and separating overlapping sheets taken out in an overlapped state on the conveying route at the time of take-out, detecting overlapping sheets not separated, and clamping and decelerating the rear ends of the overlapping sheets detected in the conveying direction and re-separating the overlapping sheets is provided.

DETAILED DESCRIPTION OF THE EMBODIMENTS

Hereinafter, the embodiments of the present invention will be explained in detail with reference to the accompanying drawings.

Figure 1:
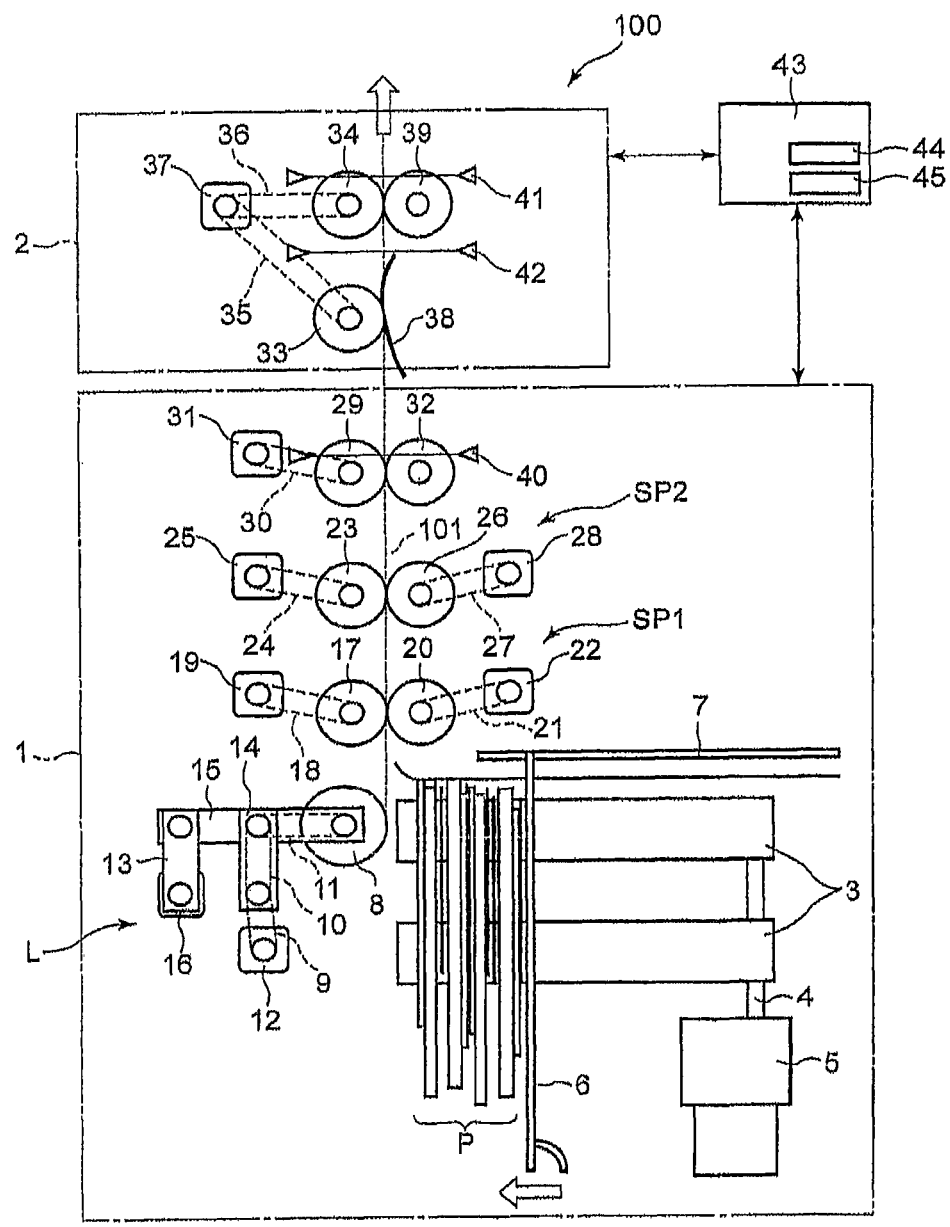
FIG. 1 is a plan view showing the schematic structure of the sheet take-out apparatus relating to the embodiments of the present invention.

FIG. 1 shows a plan view showing the schematic structure of sheet take-out apparatus 100 (hereinafter, referred to as just take-out apparatus 100) relating to the embodiments of the present invention. Take-out apparatus 100 includes separation and supply portion 1 for taking out a plurality of sheets P in a stacked state one by one on a conveying route and shifting and separating a plurality of sheets (hereinafter, sheets in this state are referred to as overlapping sheets) taken out in an overlapping state and conveying portion 2 for further conveying sheets P fed by separation and supply portion 1 to the later stage of processor.

Separation and supply portion 1 has two endless floor belts 3 extending in the stacking direction of a plurality of sheets P. Respective floor belts 3 are wound and stretched round pulleys, not drawn, installed coaxially and away from each other along rotary shaft 4, make contact with the lower end sides of the plurality of sheets P, and support the plurality of sheets P in a standing position. Floor belts 3 are driven by floor motor 5 and move the plurality of sheets P with the lower end sides in contact with them in the stacking direction.

To floor belts 3, backup plate 6 is attached. Backup plate 6, as floor belts 3 travel, makes contact with sheets P at the rear end in the stacking direction along the surface and moves all sheets P in the stacking direction. Backup plate 6 is attached slidably along rail 7 extending in the stacking direction.

On the other end side of the plurality of sheets P set in the standing position on floor belts 3 away from backup plate 6 in the stacking direction, feed-out roller 8 for feeding concerned sheets P upward in the drawing (the forward direction) by rotating in contact with sheets P on the other end side is installed. Feed-out roller 8 is rotatably attached to the front end of arm 15 extending in the stacking direction via a one-way clutch not drawn. Feed-out roller 8 is connected to feed-out motor 12 via a plurality of pulleys and a plurality of timing belts 9, 10, and 11. The one-way clutch not drew functions so as to freely rotate feed-out roller 8 in the forward direction when pulling out sheets P.

Arm 15 is supported by two support arms 13 and 14 which are parallel with each other. Namely, to support arm 14 attached to arm 15, two pulleys for winding timing belts 9, 10, and 11 aforementioned are attached. Further, on the other end side of the other support arm 13 attached to arm 15 away from arm 15, the rotary shaft of arm motor 16 for rotating support arm 13 is connected. Arm motor 16 is a servo motor under torque control.

When arm motor 16 rotates, two support arms 13 and 14 swing and arm 15 moves almost in the longitudinal direction. Namely, by use of such parallel link mechanism L, arm 15 can be moved in the axial direction thereof and feed-out roller 8 can be pressed almost perpendicularly to sheets P. The pressure of feed-out roller 8 to sheets P is controlled fixed by arm motor 16.

When feed-out motor 12 is rotated in the state that feed-out roller 8 is pressed to sheets P, feed-out roller 8 rotates in the forward direction and sheets P at the end in the stacking direction are fed out. After feed-out of sheets P, floor motor 5 rotates, and floor belts 3 travel, and next sheets P are fed to the take-out position. Further, the components indicated by reference numerals 3, 5, 6, 8, 12, and 16 aforementioned function as a take-out unit of the present invention.

On conveying route 101 on the downstream side of feed-out roller 8 in the conveying direction of sheets P, a plurality of separation units, that is, in this embodiment, two separation units SP1 and SP2 are installed away from each other in the conveying direction. First separation unit SP1 on the upstream side in the conveying direction has first feed roller 17 on one side (on the left in the drawing) of conveying route 101, that is, on the same side as feed-out roller 8 and has first separation roller 20 at the position opposite to first feed roller 17 on the other side (on the right in the drawing) of conveying route 101. Second separation unit SP2 on the downstream side in the conveying direction also has similarly second feed roller 23 and second separation roller 26 across conveying route 101. First and second separation units SP1 and SP2 have the almost same structure, so that hereinafter, first separation unit SP1 will be explained representatively, and for second separation unit SP2, only the reference numerals of the components corresponding to first separation SP1 are described, and the detailed explanation will be omitted.

The rotary shaft of first feed roller 17 (23) is connected to first feed motor 19 (25) via timing belt 18 (24). First feed roller 17 (23) is attached to the rotary shaft via a one-way clutch not drawn so as to give no load to sheets P when drawing sheets P.

Further, on first feed roller 17 (23), first separation roller 20 (26) is arranged at a fixed pressure via conveying route 101. To first separation roller 20 (26), first separation motor 22 (28) is connected via timing belt 21 (27). First separation motor 22 (28) is a servo motor under torque control and gives separation force to first separation roller 20 (26) so as to rotate in the opposite direction of the conveying direction of sheets P.

When overlapping sheets are fed onto conveying route 101 by feed-out roller 8, first sheet P is conveyed in the forward direction by first feed roller 17 on the same side as feed-out roller 8, and to the second and subsequent sheets taken out together with first sheet P, separation force in the opposite direction is given from first separation roller 20, and the overlapping sheets are shifted and separated from each other. On the other hand, when one sheet P is normally fed onto conveying route 101 by feed-out roller 8 and when no sheet P exists in the nip between first feed roller 17 and first separation roller 20, first separation roller 20 rotates following first feed roller 17.

Second separation unit SP2 has the same function as that of first separation SP1 mentioned above and functions so as to additionally shift and separate the overlapping sheets, which cannot be separated completely by first separation unit SP1, from each other.

On the downstream side of second separation unit SP2 in the conveying direction, drawing roller 29 and pinch roller 32 arranged opposite to drawing roller 29 so as to from a nip are installed. When sheets are clamped by the nip between drawing roller 29 and pinch roller 32, second separation unit SP2 performs an operation of drawing sheets existing in the nip between second feed roller 23 and second separation roller 26. To drawing roller 29 arranged on one side of conveying route 101, drawing motor 31 is connected via timing belt 30. Pinch roller 32 arranged on the other side of conveying route 101 is arranged at a fixed pressure to drawing roller 29 and rotates following drawing roller 29.

Conveying portion 2 includes first conveying roller 33 and second conveying roller 34 for conveying sheets P fed from separation and supply portion 1 to the later stage of processor (not drawn). First and second conveying rollers 33 and 34 are arranged on the left of conveying route 101 in the drawing away from each other in the conveying direction and are respectively connected to conveying motor 37 via timing belts 35 and 36. Conveying motor 37 rotates first and second conveying rollers 33 and 34 in the forward direction.

On first conveying roller 33 on the upstream side in the conveying direction, plate spring-shaped guide plate 38 (a compressing member) is arranged opposite to it via conveying route 101. Guide plate 38 is formed by bending a platy member made of resin. Guide plate 38 is attached in a convex posture toward first conveying roller 33 across conveying route 101 from the right of conveying route 101 in the drawing and is arranged in a nest shape with a plurality of roller units (not drawn) of first conveying roller 33. Namely, at the intervals between the plurality of roller units which are arranged at predetermined intervals, belt-shaped guide plates 38 are respectively arranged. By doing this, guide plates 38 can press sheets P conveyed between the guide plates and first conveying roller 33 to first conveying roller 33 at weak pressure.

Concretely, guide plates 38 clamp sheets P with clamp force weaker than the clamp force of sheets P by drawing roller 29 and pinch roller 32 between the guide plates and first conveying roller 33. In other words, guide plates 38, when drawing roller 29 is decelerated or stopped in the state that sheets P are conveyed by drawing roller 29 and first conveying roller 33, give clamp force to sheets P so as to decelerate or stop sheets P depending on the rotational speed of drawing roller 29.

At the position on the right of conveying route 101 in the drawing and opposite to second conveying roller 34, pinch roller 39 driven to rotate in contact with second conveying roller 34 is installed. Pinch roller 39 is arranged so as to give a fixed pressure to second conveying roller 34 via conveying route 101.

Immediately after the nip between drawing roller 29 and pinch roller 32 of separation and supply portion 1 mentioned above, first sensor 40 is arranged. First sensor 40 has a light emitting unit and a light receiving unit and a light beam emitted from the light emitting unit is received by the light receiving unit. Namely, sheets P shield the optical axis of the light beam, thus the sensor output is turned off, and the first sensor detects passing of sheets P. Further, immediately after the nip between second conveying roller 34 and pinch roller 39 of conveying portion 2, second sensor 41 is arranged. Furthermore, between first conveying roller 33 and second conveying roller 34, third sensor 42 is arranged. Second and third sensors 41 and 42 also function similarly to first sensor 40 aforementioned and detect passing of sheets P at the positions where the respective light beams cross conveying route 101.

The distance between the position where the light beam of first sensor 40 crosses conveying route 101 and the position where the light beam of second sensor 41 crosses conveying route 101 is set as indicated below. Namely, the distance is set so that the inter-sensor distance is slightly longer (in this embodiment, 270 [mm]) than the length (in this embodiment, 250 [mm]) of a sheet longest in length (hereinafter, referred to as a longest sheet) in the conveying direction among sheets P to be processed by take-out apparatus 100 of this embodiment.

Furthermore, all motors 5, 12, 16, 19, 22, 25, 28, 31, and 37 of take-out apparatus 100 aforementioned are connected to controller 43 via a control circuit not drawn. To controller 43, the output terminals, not drawn, of first to third sensors 40, 41, and 42 aforementioned are connected and the conveying condition of sheets P is sent to controller 43. Furthermore, controller 43 includes internally timer 44 for measuring the conveying time of sheets P and gap counter 45 for counting the number of gaps between sheets P. Further, controller 43 functions as drawing roller 29 and pinch roller 32 aforementioned and as a re-separation unit of the present invention. First sensor 40 and second sensor 41 aforementioned function as an overlapping detector of the present invention.

Controller 43 presses floor motor 5 to move floor belt 3 and moves backup plate 6. By movement of backup plate 6, sheets P put on floor belt 3 in the standing position are moved toward feed roller 8 in the stacking direction. When sheets P in the moving direction are arranged at the take-out position and are rotated in contact with feed roller 8, controller 43 rotates feed-out motor 12, rotates feed-out roller 8, and feeds sheets P at the end in the stacking direction onto conveying route 101.

Sheets P fed onto conveying route 101 are conveyed in the forward direction by the plurality of motors 17, 23, 29, 33, and 34 installed on the same side of conveying route 101 as feed-out roller 8. At this time, to form appropriate gaps between sheets P taken out continuously and surely convey free of creases, the feed speed of sheets P by each roller, that is, the peripheral speed is set so as to slightly increase toward the downstream side in the conveying direction. Concretely, the peripheral speed of first feed roller 17 is made faster than that of feed-out roller 8, and the peripheral speed of second feed roller 23 is made faster than that of first feed roller 17, and the peripheral speed of drawing roller 29 is made faster than that of second feed roller 23, and the peripheral speeds of first and second conveying rollers 33 and 34 are set to be the same as that of drawing roller 29.

When sheets P fed onto conveying route 101 by feed-out roller 8 are overlapping sheets and the concerned overlapping sheets pass first separation unit SP1, first sheet P is fed in the forward direction by first feed roller 17 and second and subsequent sheets P are given separation force from first separation roller 20 and are shifted and separated. The overlapping sheets which pass first separation unit SP1 and are not separated completely are further shifted and separated when passing second separation unit SP2 and are drawn by drawing roller 29 and pinch roller 32 having a peripheral speed slightly faster than that of second feed roller 23.

Sheets P which pass separation and supply portion 1 and are separated one by one in this way are conveyed by first conveying roller 33 and second conveying roller 34 of conveying portion 2 and are fed to a processor not drawn from take-out apparatus 100.

Further, the gaps between sheets P aforementioned are formed by using first sensor 40. Namely, so as to make the gaps between sheets P before passing the optical axis of first sensor 40 slightly smaller than the target gap, the peripheral speeds of rollers 8, 17, 23, and 29 are set. The time from passing of the rear end of preceding sheet P passing first sensor 40 in the conveying direction to passing of the front end of succeeding sheet P in the conveying direction is measured by timer 44, and the gap between the two is measured from this time, and so as to use this gap as a target gap, the conveyance of succeeding sheets P is retarded.

When retarding the conveyance of succeeding sheets P, the rotational speeds of drawing roller 29 and pinch roller 32 are decreased and rollers 8, 17, 23, and 29 on the upstream side in the conveying direction are all decelerated. Alternatively, rollers 8, 17, 23, and 29 may be stopped or rotated reversely only for a short time.

Next, the re-separation operation when overlapping sheets cannot be separated by first separation unit SP1 and second separation unit SP2 of take-out apparatus 100 aforementioned will be explained by referring to the flow charts shown in FIGS. 2 and 3 and the operation illustrations shown in FIGS. 4 and 5.

The overlapping sheets which are not separated by first separation unit SP1 and neither separated by second separation unit SP2 are fed to conveying portion 2 after passing first sensor 4 in a state that they are at least overlapped partially. At this time, it is highly probable that the overlapping sheets fed to conveying portion 2, after passing first separation unit SP1 and second separation unit SP2, are conveyed at least in the shifted state and in such a case, as shown in FIG. 4, the length in the conveying direction is mostly longer than the longest sheet processed by take-out apparatus 100. Therefore, this embodiment, when the length of sheets P fed to conveying portion 2 in the conveying direction is longer than the longest sheet, judges that they are overlapping sheets.

Figure 4:
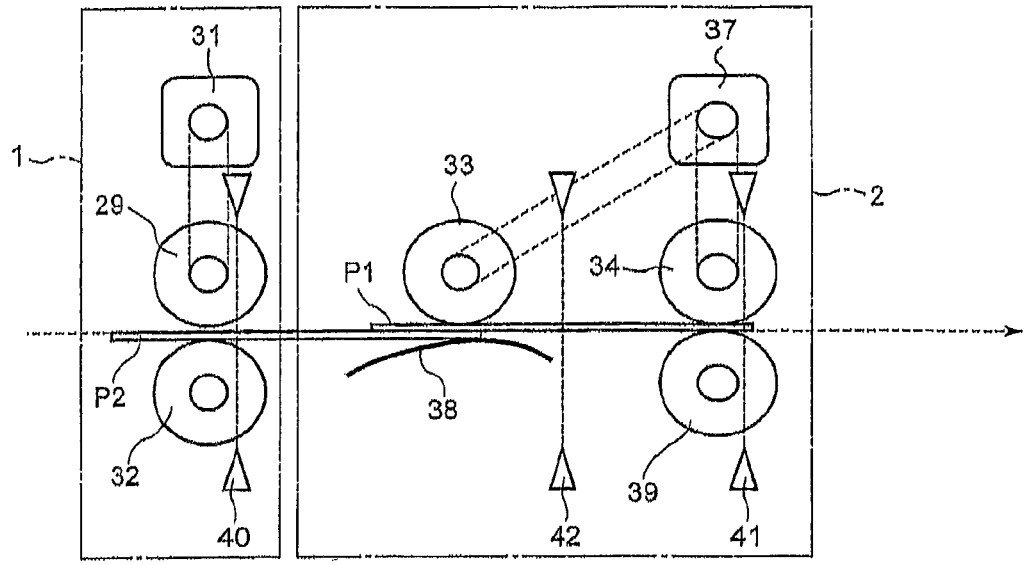
FIG. 4 is a plan view for explaining the re-separation operation of overlapping sheets.

Concretely, as shown at Steps 1 and 2, when two sensors 40 and 41 at a distance more than the longest sheet become dart at the same time (Yes at Step 1 and Yes at Step 2), controller 43, as shown in FIG. 4 basically judges that overlapping sheets are conveyed. However, in this case, for example, as shown in FIG. 5, a case that between first sensor 40 and second sensor 41, there are gaps between sheets P may be considered. Therefore, controller 43, when first and second sensors 40 and 41 are dark simultaneously and there are no gaps between the two (Yes at Step 3), judges that overlapping sheets are conveyed (Step 4).

Figure 3:
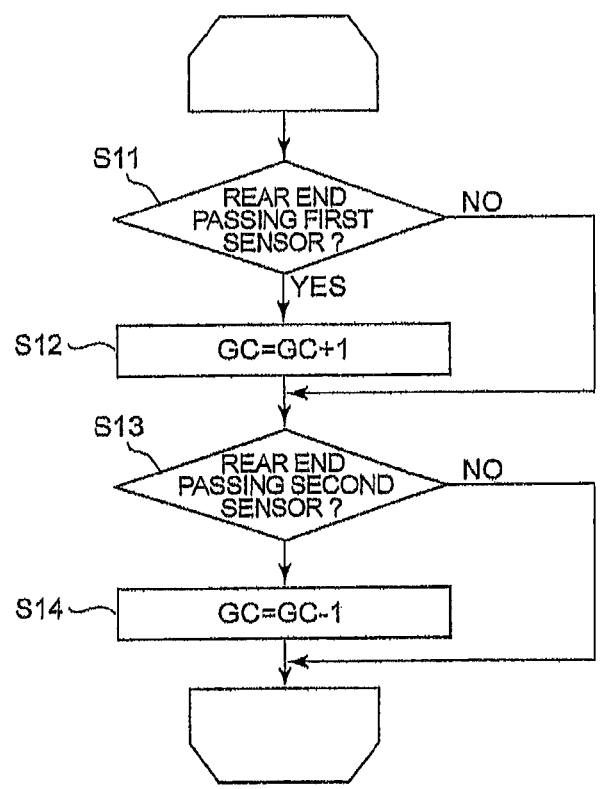
FIG. 3 is a flow chart for explaining the operation of a gap counter.

The judgment of whether there are gaps of sheets P between first sensor 40 and second sensor 41 or not, as shown in FIG. 3, is performed using gap counter 45 built in controller 43. Namely, controller 43, when first sensor 40 detects (Yes at Step 11 shown in FIG. 3) that the rear end of sheet P in the conveying direction passes first sensor 40, counts up gap counter 45 (Step 12) and when second sensor 41 detects (Yes at Step 13) that the rear end of sheet P in the conveying direction passes second sensor 41, counts down gap counter (Step 14). By counting by gap counter 45 like this, the number of gaps of sheets existing between first sensor 40 and second sensor 41 is counted. As a result, controller 43, when gap counter 45 indicates zero, judges that there are no gaps between sheets conveyed.

Namely, controller 43, when first and second sensors 40 and 41 are dark simultaneously (Yes at Step 1 and Yes at Step 2) and gap counter 45 indicates zero (Yes at Step 3), judges that overlapping sheets are conveyed (Step 4).

Controller 43, when it judges at Step 4 that overlapping sheets are conveyed, stops drawing roller 29 and pinch roller 32 in order to re-separate the concerned overlapping sheets (Step 5). At this time, naturally, controller 43 stops all rollers 8, 17, 23, and 29 of separation and supply portion 1. Since first and second sensors 40 and 41 are dark simultaneously in this condition, as shown in FIG. 4, the front ends of the overlapping sheets in the conveying direction are clamped and restricted by the nip between second conveying roller 34 and pinch roller 39 and are fed in the forward direction and the rear ends in the conveying direction are clamped and restricted by the nip between drawing roller 29 and pinch roller 32 stopped.

More concretely, as shown in FIG. 4, when two sheets P1 and P2 are partially overlapped and conveyed, the neighboring part of the front end of first sheet P1 on the side of conveying rollers 33 and 34 in the conveying direction is clamped and restricted by the nip between second conveying roller 34 and pinch roller 39 and is conveyed in the forward direction, and the neighboring part of the rear end of second sheet P2 shifted backward from first sheet P1 in the conveying direction is clamped and restricted by the nip between drawing roller 29 and pinch roller 32 stopped, and first sheet P1 and second sheet P2 are drawn apart and separated.

At this time, when the pressure by the guide plate 38 opposite to first conveying roller 33 rotating in contact with the overlapped part of two sheets P1 and P2 is strong, the possibility of second sheet P2 being taken out by first sheet P1 is increased, so that as in this embodiment, it is effective to install the guide plate 38 to make the press weak.

Figure 5:
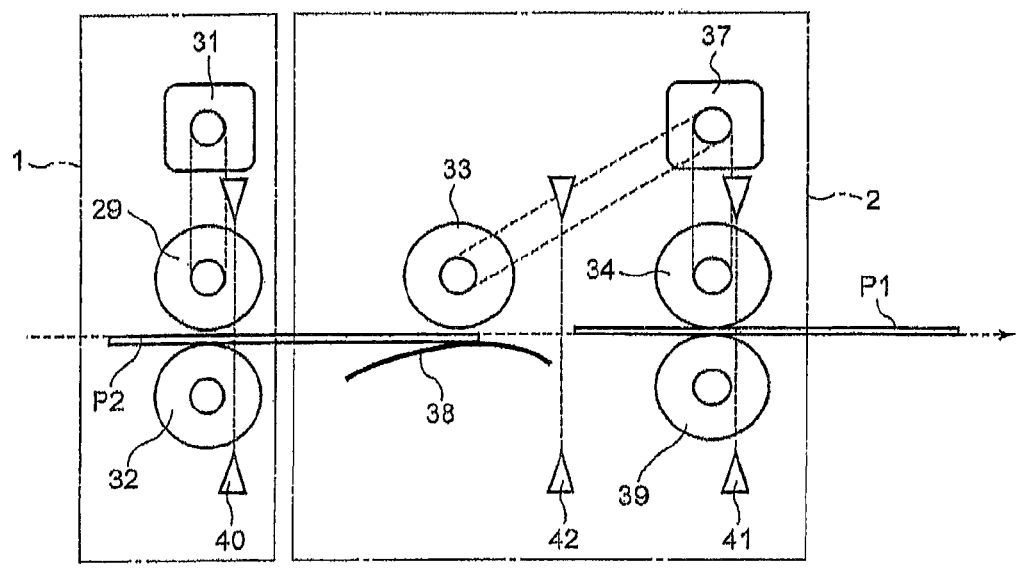
FIG. 5 is a plan view for explaining the re-separation operation of overlapping sheets.

And, when the rear end of separated and preceding sheet P1 in the conveying direction, as shown in FIG. 5, is detected via second sensor 41 or third sensor 42 (Yes at Step 6), controller 43 judges that the concerned overlapping sheets are separated, restarts the operations of all rollers 8, 17, 23, and 29 stopped at Step 5 (Step 7), and continues the process.

On the other hand, controller 43, when it judges at Step 3 that the gap counter does not indicate zero, for example, as shown in FIG. 5, judges that although two sensors 40 and 41 are dark, there are gaps of sheets P1 and P2 between sensors 40 and 41, and judges that the concerned sheets are not overlapping sheets (Step 8), and rotates all the rollers as usual (Step 9).

As mentioned above, according to this embodiment, controller 43, when the sheets passing second separation unit SP2 are clamped and restricted by the nip between drawing roller 29 and pinch roller 32, decides overlapping, and immediately after deciding overlapping, clamps and stops the rear ends of the overlapping sheets in the conveying direction by drawing roller 29 and pinch roller 32, and re-separates the overlapping sheets. Therefore, controller 43 serves as drawing roller 29 and pinch roller 32 for drawing the sheets from second separation unit SP2, thus can re-separate overlapping sheets which cannot be separated by first separation unit SP1 and second separation unit SP2, so that by use of an inexpensive constitution without adding a new apparatus constitution, overlapping sheets can be surely separated. Therefore, the processing capacity of sheets P by take-out apparatus 100 can be enhanced. Particularly, take-out apparatus 100 of this embodiment, after trying to separate overlapping sheets by first separation unit SP1 and second separation unit SP2, can try separation when drawing the overlapping sheets from second separation unit SP2 by drawing roller 29 and pinch roller 32, can try separation under the re-separation control aforementioned, can execute the four separation operations in total, and can separate more surely the overlapping sheets.

In the first embodiment aforementioned, the return timing of the stopped rollers is set using the detection of the rear ends of sheets in the conveying direction by second sensor 41 or third sensor 42 as a trigger, though third sensor 42 may not be an essential constitution of the invention. Alternatively, between first sensor 40 and second sensor 41, a plurality of third sensors may be installed.

Figure 2:
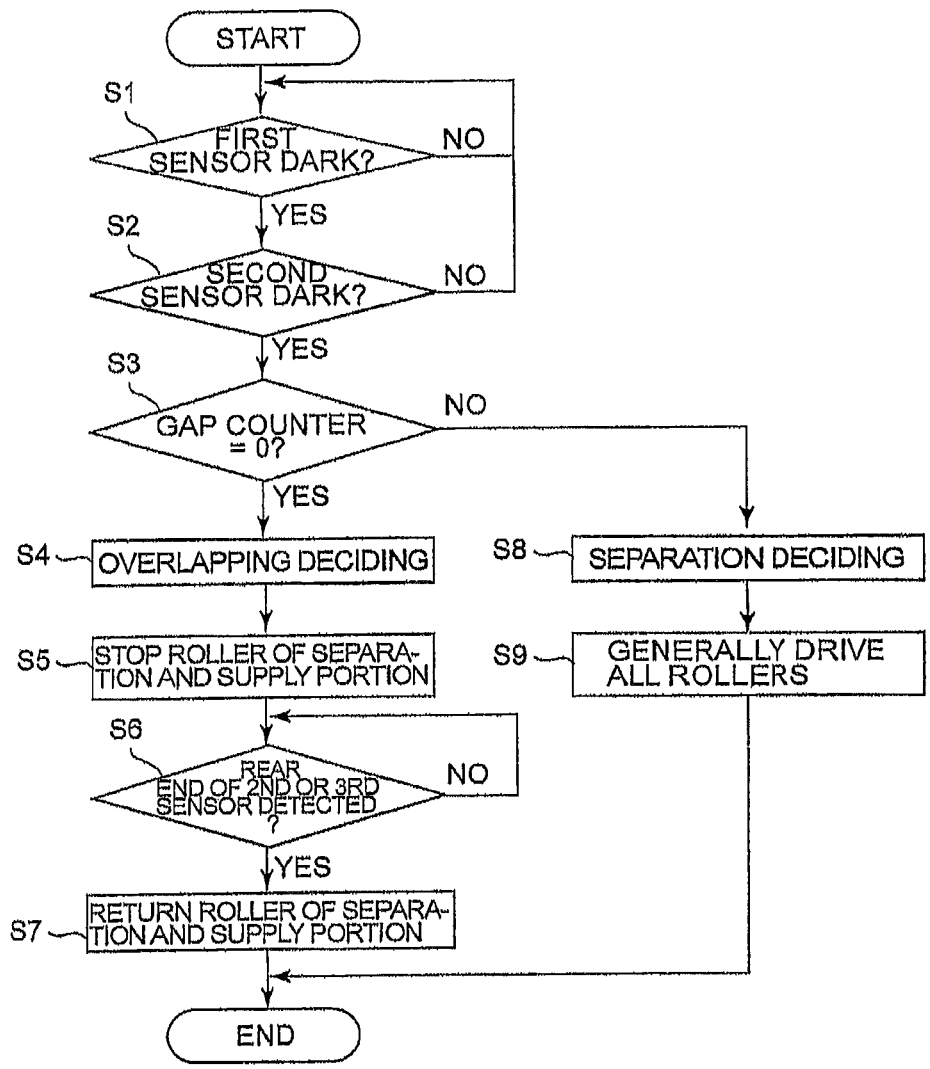
FIG. 2 is a flow chart for explaining the re-separation operation by the sheet take-out apparatus shown in FIG. 1.

Further, in consideration of a case that a sheet with a length longer than the maximum sheet to be processed by take-out apparatus 100 is taken out, to the stop time of the drawing roller at Step 5 shown in FIG. 2, an upper limit may be set. Namely, when a sheet longer than the longest sheet is decided as an overlapping sheet, in a state that the rear end in the conveying direction is stopped by drawing roller 29 and pinch roller 32, second sensor 41 or third sensor 42 will not become dark for a long time, so that take-out apparatus cannot move to the processes at Steps 6 and 7.

Furthermore, in the embodiment aforementioned, when the overlapping sheets are detected, drawing roller 29 and pinch roller 32 are stopped. However, the present invention is not limited to it, and drawing roller 29 and pinch roller 32 may be decelerated or rotated reversely, and even in this case, the similar effect can be produced. Further, "deceleration" in the claims includes stop and reverse rotation.

Next, another embodiment of the present invention will be explained with reference to the flow chart shown in FIG. 6. Further, the constitution of this embodiment is the same as that of take-out apparatus 100 of the aforementioned embodiment except that it has not second sensor 41 and third sensor 42, so that here, the explanation of the apparatus constitution will be omitted.

Figure 6:
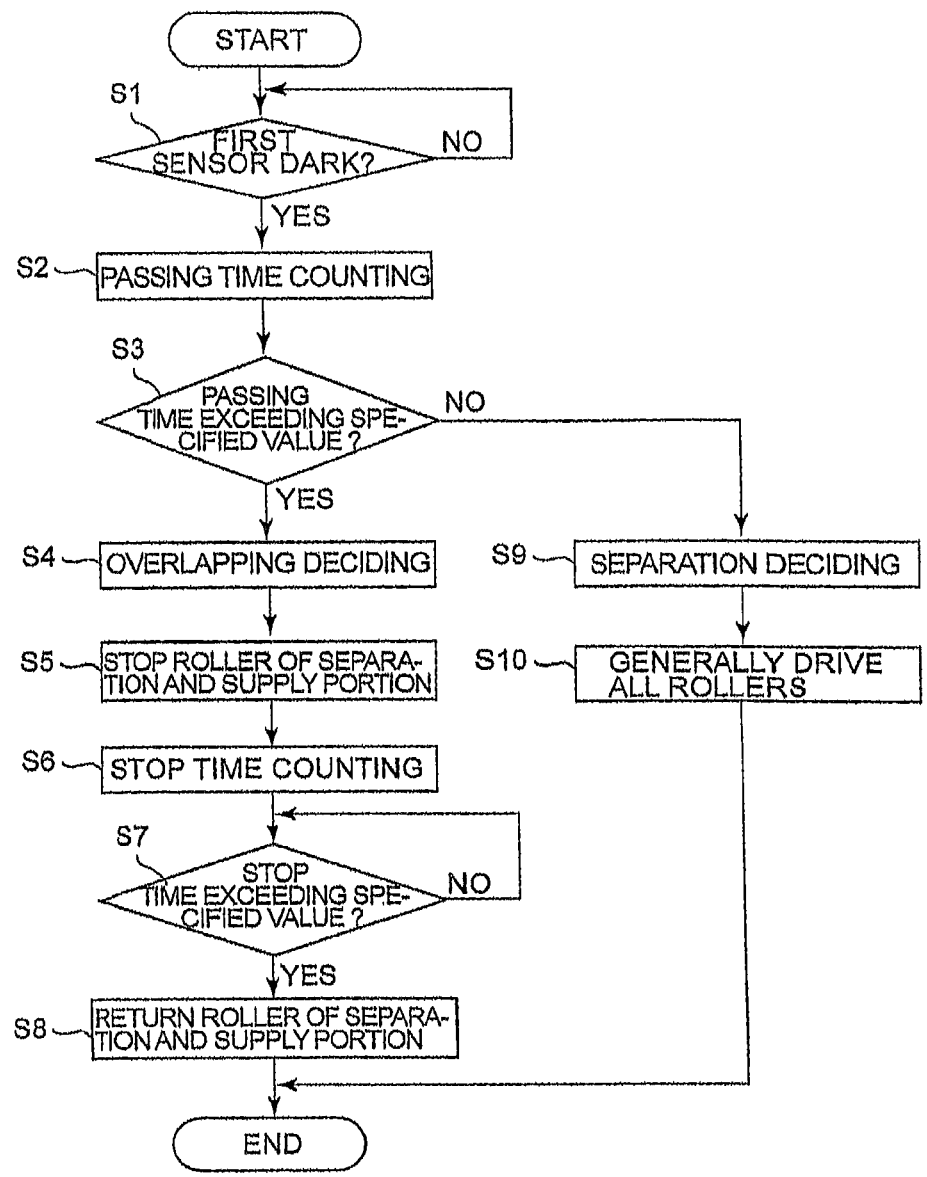
FIG. 6 is a flow chart for explaining the re-separation operation relating to another embodiment.

As shown at Step 1 in FIG. 6, when sheets P are detected via first sensor 40 (Yes at Step 1), controller 43 counts the passing time by timer 4 (Step 2). And, controller 43 compares the passing time counted at Step 2 with a reference time (specified value) prepared beforehand (Step 3), and when the counted passing time exceeds the specified value (Yes at Step 3), decides that there are overlapping sheets (Step 4). The specified value referred to as here is a value obtained by dividing the length of the longest sheet in the conveying direction by the conveying speed of sheets.

Immediately after deciding overlapping at Step 4, controller 43 stops drawing roller 29 and pinch roller 32, also stops feed-out roller 8, first feed roller 17, and second feed roller 23 (Step 5), and counts the stop time (Step 6). The front ends of the overlapping sheets in the conveying direction are fed in the forward direction by first and second conveying rollers 33 and 34 in this state, so that the overlapping sheets are separated in the same way as with the first embodiment aforementioned. Further, also in this case, each roller may be decelerated or rotated reversely instead of stopping.

When the stop time counted at Step 6 exceeds the specified value prepared beforehand (Yes at Step 7), controller 43 judges that the concerned sheets are separated, restarts the rotation of all rollers 8, 17, 23, and 29 which are stopped at Step 5, and continues the process. Further, in this case, the specified value of the stop time is a value obtained by dividing "length of the longest sheet in the conveying direction +target gap" by the conveying speed of sheets.

On the other hand, when first sensor 40 becomes bright before judging at Step 3 that the passing time of sheets P exceeds the specified value, controller 43 judges that the concerned sheets are not overlapping sheets (Step 9), rotates drawing roller 29 and pinch roller 323 as usual (Step 10), and continues the process.

As mentioned above, this embodiment can produce the same effect as that of the aforementioned embodiment and excludes second and third sensors 41 and 42, so that the apparatus constitution can be simplified more and can provide a more inexpensive take-out apparatus.

Inversely, it is possible to install a sensor on the downstream side of first sensor 40 in the conveying direction and obtain the return timing of the rollers, thus the processing time can be shortened.

Further, the present invention is not limited straight to the aforementioned embodiments and in the execution stage, within a range which is not deviated from the object thereof, the components can be modified and materialized. Further, by appropriate combinations of a plurality of components disclosed in the aforementioned embodiments, various inventions can be formed. For example, from all the components indicated in the aforementioned embodiments, some may be deleted. Furthermore, components extending over the different embodiments may be combined appropriately.

For example, in the aforementioned embodiments, a case that the length of sheets P in the conveying direction is detected and compared with the reference value, thus overlapping sheets are detected is explained. However, the present invention is not limited to it and the thickness of sheets P is detected, thus overlapping sheets may be detected.

Further, in the aforementioned embodiments, when separating sheets P, frictional force in different directions is acted on overlapped sheets, thus sheets P are shifted and separated. However, the present invention is not limited to it and it is possible to adsorb one side of sheet P, thereby separate it from overlapping sheets.

Furthermore, in the aforementioned embodiments, a case that in a mechanism for conveying sheets P along conveying route 101, independent rollers are used is explained. However, the present invention is not limited to it and a conveying roller composed of a plurality of rollers wound and stretched may be used in place of it.

The sheet take-out apparatus of the present invention has the aforementioned constitution and operation, so that by use of an inexpensive constitution, overlapping sheets can be separated surely and the processing capacity can be enhanced.

What is claimed is:

1. A sheet take-out apparatus, comprising:
   a take-out unit configured to take out a plurality of sheets in a stacked state one by one on a conveying route;
   a separation unit configured to shift and to separate overlapping sheets among the plurality of sheets taken out by the take-out unit on the conveying route, the overlapping sheets including a preceding sheet and a succeeding sheet, the separation unit being arranged downstream from the take-out unit on the conveying route, and the separation unit including a first feed roller on one side of the conveying route and a first separation roller opposite to the first feed roller on the other side of the conveying route to apply a separation force to the overlapping sheets;
   an overlapping detector configured to detect overlapping sheets that have not been separated by the separation unit; and
   a re-separation unit configured to clamp and stop, decelerate, or reversely rotate a rear end of the succeeding sheet detected by the overlapping detector along a conveying direction to re-separate the overlapping sheets, the re-separation unit including:
   a drawing roller on the same side of the first feed roller and a pinch roller on the same side of the first separation roller and arranged downstream from the separation unit on the conveying route to draw out the sheet from the separation unit, the rotation direction and speed of the drawing roller driven by a motor, the pinch roller maintained at a fixed pressure against the drawing roller to rotate in accordance with the drawing roller, and
   a conveying roller arranged downstream from the drawing roller and the pinch roller, the conveying roller being arranged to receive a front end of the preceding sheet and to convey the preceding sheet,
   wherein the re-separation unit operates such that the rotational speed of the drawing roller is stopped, decelerated, or reversely rotated while the drawing roller and the pinch roller clamp the rear end of the succeeding sheet.

2. The sheet take-out apparatus according to claim 1, wherein a plurality of the separation units are installed in the conveying route.

3. The sheet take-out apparatus according to claim 1, wherein the overlapping detector is configured to detect the overlapping sheets, which are clamped and restricted by a nip between the drawing roller and the pinch roller.

4. The sheet take-out apparatus according to claim 3, wherein the drawing roller and the pinch roller clamps the rear end of the succeeding sheet immediately after the overlapping detector detects the overlapping sheets.

5. The sheet take-out apparatus according to claim 1, wherein the re-separation unit includes a controller to stop the rotation of the drawing roller.

6. A sheet take-out apparatus, comprising:
   a take-out unit configured to take out a plurality of sheets in a stacked state one by one on a conveying route;
   a separation unit configured to shift and to separate overlapping sheets among the plurality of sheets taken out by the take-out unit on the conveying route, the overlapping sheets including a preceding sheet and a succeeding sheet, the separation unit being arranged downstream from the take-out unit on the conveying route, and the separation unit including a first feed roller on one side of the conveying route and a first separation roller opposite to the first feed roller on the other side of the conveying route to apply a separation force to the overlapping sheets;
   an overlapping detector configured to detect overlapping sheets that have not been separated by the separation unit; and
   a re-separation unit configured to clamp and stop, decelerate, or reversely rotate a rear end of the succeeding sheet detected by the overlapping detector along a conveying direction to re-separate the overlapping sheets, the re-separation unit including:
   a drawing roller on the same side of the first feed roller and a pinch roller on the same side of the first separation roller and arranged downstream from the separation unit on the conveying route to draw out the sheet from the separation unit, the rotation direction and speed of the drawing roller driven by a motor, the pinch roller maintained at a fixed pressure against the drawing roller to rotate in accordance with the drawing roller, and
   a conveying roller arranged downstream from the drawing roller and the pinch roller, the conveying roller being arranged to receive a front end of the preceding sheet and to convey the preceding sheet, wherein the re-separation unit operates such that the rotational speed of the drawing roller is stopped, decelerated, or reversely rotated while the drawing roller and the pinch roller clamp the rear end of the succeeding sheet, and wherein the separation unit includes a first and second separation portion, the first separation portion having the first feed roller and the first separation roller opposite to the first feed roller to apply the separation force to the overlapping sheets, and the second separation portion having a second feed roller and a second separation roller opposite to the second feed roller to apply a separation force to the overlapping sheets.

7. The sheet take-out apparatus according to claim 6, wherein the peripheral speed of the second feed roller is faster than that of the first feed roller.

8. The sheet take-out apparatus according to claim 7, wherein the peripheral speed of the drawing roller is faster than that of the second feed roller, and the first and second feed roller being attached to a rotary shaft via a one-way clutch, respectively.

9. The sheet take-out apparatus according to claim 6, wherein the re-separation unit includes a controller to stop the rotation of the drawing roller, the controller also stops the first and second feed rollers when the rotation of the drawing roller is stopped.

10. The sheet take-out apparatus according to claim 9, further comprising a sensor arranged immediately after the conveying roller, wherein the controller restarts the operation of the drawing roller, the first feed roller and the second feed roller when the sensor detects the rear end of the preceding sheet.

11. A sheet take-out apparatus, comprising:
a take-out unit configured to take out a plurality of sheets in a stacked state one by one on a conveying route;
a first separation unit configured to shift and to separate overlapping sheets among the plurality of sheets taken out by the take-out unit on the conveying route, the first separation unit being arranged downstream from the take-out unit on the conveying route, and the first separation unit having a first feed roller and a first separation roller opposite to the first feed roller to apply a separating force to the overlapping sheets;
a second separation unit configured to shift and to separate overlapping sheets among the plurality of sheets taken out by the take-out unit on the conveying route, the second separation unit being arranged downstream from the first separation unit, and the second separation unit having a second feed roller and a second separation roller opposite to the second feed roller to apply a separating force to the overlapping sheets;
a drawing roller arranged downstream from the second separation unit and configured to draw out the sheet from the second separation unit;
a conveying roller arranged downstream from the drawing roller and configured to convey the sheet drawn out by the drawing roller;
a detecting unit configured to detect overlapping sheets that have not been separated by the first separation unit and the second separation unit; and
a controller configured to stop a rotation of the drawing roller to re-separate the overlapping sheets when the detecting unit detects overlapping sheets that have not been separated.

12. The sheet take-out apparatus according to claim 11, wherein the peripheral speed of the second feed roller is faster than that of the first feed roller.

13. The sheet take-out apparatus according to claim 12, wherein the peripheral speed of the drawing roller is faster than that of the second feed roller, and the first feed roller and the second feed roller are attached to a rotary shaft via a one-way clutch, respectively.

14. The sheet take-out apparatus according to claim 11, wherein the controller also stops the first feed roller and the second feed roller when the rotation of the drawing roller is stopped.

15. The sheet take-out apparatus according to claim 14, further comprising a sensor arranged immediately after the conveying roller, wherein the controller restarts the operation of the drawing roller, the first feed roller, and the second feed roller when the sensor detects a rear end of the preceding sheet.

16. The sheet take-out apparatus according to claim 14, wherein the sensor is arranged between the drawing roller and the conveying roller.

* * * * *